(12) United States Patent
Pimley et al.

(10) Patent No.: US 6,329,779 B1
(45) Date of Patent: Dec. 11, 2001

(54) OBSTACLE DETECTION METHOD FOR A MOTOR-DRIVEN PANEL

(75) Inventors: John Thomas Pimley, Noblesville; Robert W. Hjelmeland, Sharpsville, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/648,971

(22) Filed: Aug. 28, 2000

(51) Int. Cl.$^7$ ...................................................... G05B 5/00
(52) U.S. Cl. ..................... 318/445; 318/444; 318/443; 318/461; 318/468; 318/466; 318/282; 318/476; 318/465
(58) Field of Search ..................................... 318/466, 282, 318/468, 465, 476, 445, 449, 456, 461, 469, 443, 444

(56) References Cited

U.S. PATENT DOCUMENTS

| | | | |
|---|---|---|---|
| 4,823,059 | 4/1989 | Compeau et al. | 318/454 |
| 5,334,876 | * 8/1994 | Washeleski et al. | 318/469 |
| 6,064,165 | * 5/2000 | Boisvert et al. | 318/465 |
| 6,208,102 | * 3/2001 | Kikuchi et al. | 318/466 |

* cited by examiner

*Primary Examiner*—Karen Masih
(74) *Attorney, Agent, or Firm*—Jimmy L. Funke

(57) ABSTRACT

An improved method of detecting the presence of an obstacle in the path of a motor-driven panel by computing the slope of a measured motor speed signal in a way that cancels the effect of periodic undulation of the speed signal, and comparing the computed slope to a slope threshold that is selected as a function of the average motor speed. A position sensor produces a series of pulses corresponding to panel movement, and a microprocessor-based controller stores an array of speed-related samples corresponding to the time periods between successively produced sensor pulses. The average speed is computed at two different points in the array, and the slope of the stored speed samples is determined according to a difference between the computed average speeds. Periodic variation in successive motor speed samples due to a periodic variation in the sensor pulse spacing has a repetition interval corresponding to a fixed number of samples, and the average speeds are computed based on speed samples that are separated by one-half of the repetition interval to substantially eliminate the effect of the periodic variation. The slope threshold for obstacle detection decreases with increasing average motor speed so that obstacle detection occurs when the obstacle exerts a given force on the panel, regardless of the panel speed.

4 Claims, 2 Drawing Sheets

OBSTACLE DETECTION METHOD FOR A MOTOR-DRIVEN PANEL

TECHNICAL FIELD

This invention relates to a method of operation for a motor-driven panel, such as a window, and more particularly to a method for triggering a reversal of the motor when the panel is driven into contact with an obstacle.

BACKGROUND OF THE INVENTION

For safety-related reasons, control systems governing the operation of motor-driven automotive panels (such as windows, sliding doors, trunk lids, sun-roofs, etc.) are typically designed to reverse the motor for retracting the panel in response to a detected engagement of the panel with an obstacle prior to reaching a desired position. See, for example, the U.S. Pat. No. 4,823,059, issued Apr. 18, 1989, which detects the presence of an obstacle in the path of a motor-driven deck lid when the motor current exceeds a predefined threshold. In order to avoid false detection of an obstacle, the control must somehow account for normally occurring variations in system voltage, wear and mechanical friction. For example, the control could be designed to measure the speed of the motor or panel, and to detect the presence of an obstacle if the measured speed is suddenly reduced in a range of panel displacement where an obstacle might be encountered. However, if the obstacle is relatively compliant, a sudden change in motor speed may not occur when the panel initially contacts the obstacle, and the control may fail to detect the obstacle as desired. If the detection thresholds are adjusted to increase sensitivity to changes in the measured speed, periodic undulations in the measured speed signal can be interpreted as a speed reduction, leading to false obstacle detection. Filtering may be used to remove the periodic undulation, but the signal delay caused by filtering correspondingly delays detection of the obstacle, which is undesirable.

Accordingly, what is needed is an improved obstacle detection method that is insensitive to variations in system voltage, wear and mechanical friction, and which is capable of reliably detecting the presence of an obstacle, even if the motor speed change due to the panel contacting the obstacle occurs only gradually.

SUMMARY OF THE INVENTION

The present invention is directed to an improved method of detecting the presence of an obstacle in the path of a motor-driven panel by computing the slope of a measured motor speed signal in a way that cancels the effect of periodic undulation of the speed signal, and comparing the computed slope to a slope threshold that is selected as a function of the average motor speed. A position sensor produces a series of pulses corresponding to panel movement, and a microprocessor-based controller stores an array of speed-related samples corresponding to the time periods between successively produced sensor pulses. The average speed is computed at two different points in the array, and the slope of the stored speed samples is determined according to a difference between the computed average speeds. Periodic variation in successive motor speed samples due to a periodic variation in the sensor pulse spacing has a repetition interval corresponding to a fixed number of samples, and the average speeds are computed based on speed samples that are separated by one-half of the repetition interval to substantially eliminate the effect of the periodic variation. The slope threshold for obstacle detection decreases with increasing average motor speed so that obstacle detection occurs when the obstacle exerts a given force on the panel, regardless of the panel speed.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a main flow diagram for carrying out the panel control, while FIG. 4 is a flow diagram executed in response to pulses produced by the position sensor of FIG. 1.

DESCRIPTION OF THE PREFERRED EMBODIMENT

Figure 1:
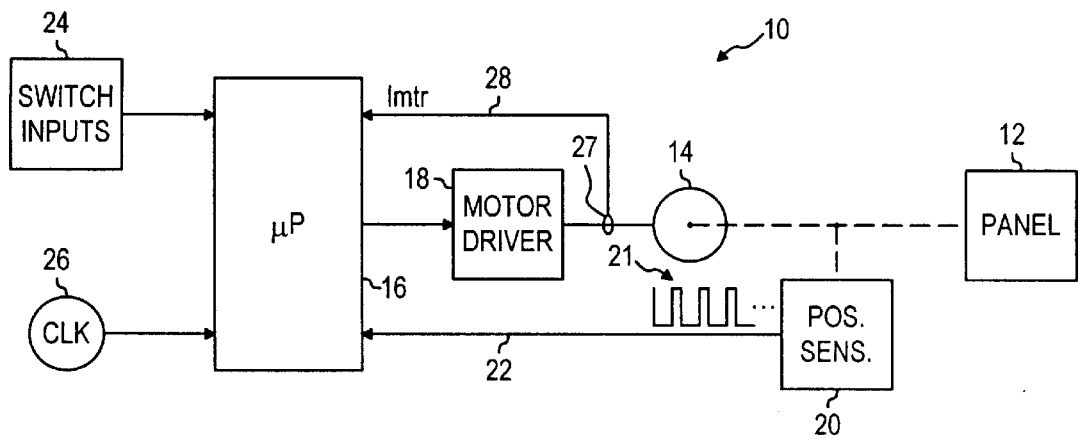
FIG. 1 is a block diagram of a motor-driven panel control, including a position sensor and a microprocessor-based motor control unit.

Referring to the drawings, and more particularly to FIG. 1, the reference numeral 10 generally designates a motor drive system for an automotive panel 12, such as a side window. The panel 12 is coupled through a suitable linkage to the rotor of an electric motor 14, and the motor windings are energized by a conventional motor driver circuit 18 under the control of a microprocessor-based controller 16. The controller 16 receives inputs from a number of sources, including position sensor 20, switch inputs 24, clock 26 and a motor current sensor 27. The position sensor 20, which may be a conventional Hall or optical sensor for example, responds to movement of the panel 12 or motor 14 and produces a series of pulses (as indicated by the reference numeral 21) on line 22. The controller 16 interprets a designated edge (rising or trailing) of each sensor pulse 21 as an interrupt request, triggering the execution of an interrupt service routine, explained below in reference to the flow diagram of FIG. 4. The switch inputs 24 signify a desired movement of panel 12, and in the illustrated embodiment, may consist of a single toggle switch indicating that the panel 12 is to be moved to a desired position (e.g., open or closed). The clock 26, which may be located inside controller 16, simply provides a high frequency pulse-train that can be used to measure the time interval between successive sensor pulses applied to controller 16 on line 22. Finally, the motor current sensor 27 simply produces a signal Imtr on line 28 indicative of the current supplied to motor 14.

In general, the controller 16 responds to the switch inputs 24 to activate motor 14 for moving the panel 12 in a desired direction or to a desired position. The pulses 21 produced by position sensor 20 may be counted to determine the panel position, and if the motor current Imtr exceeds a threshold when the panel is near a fully closed or fully open position, the controller 16 commands motor driver 18 to de-activate motor 14. Additionally, the speed of the panel 12 (or motor 14) may be determined by using the pulse-train of clock 26 to measure the time period between successive sensor pulses. Theoretically, the determined speed can be used to detect the presence of an obstacle in the path of panel 12, based on a sudden reduction in the speed of the panel. However, as mentioned above, only a small change in speed occurs when the panel 12 comes into contact with a relatively compliant obstacle, making it difficult to detect such an obstacle without causing false detections due to periodic undulations in the measured speed signal, or without utilizing heavy filtering which undesirably delays obstacle detection.

Figure 2:
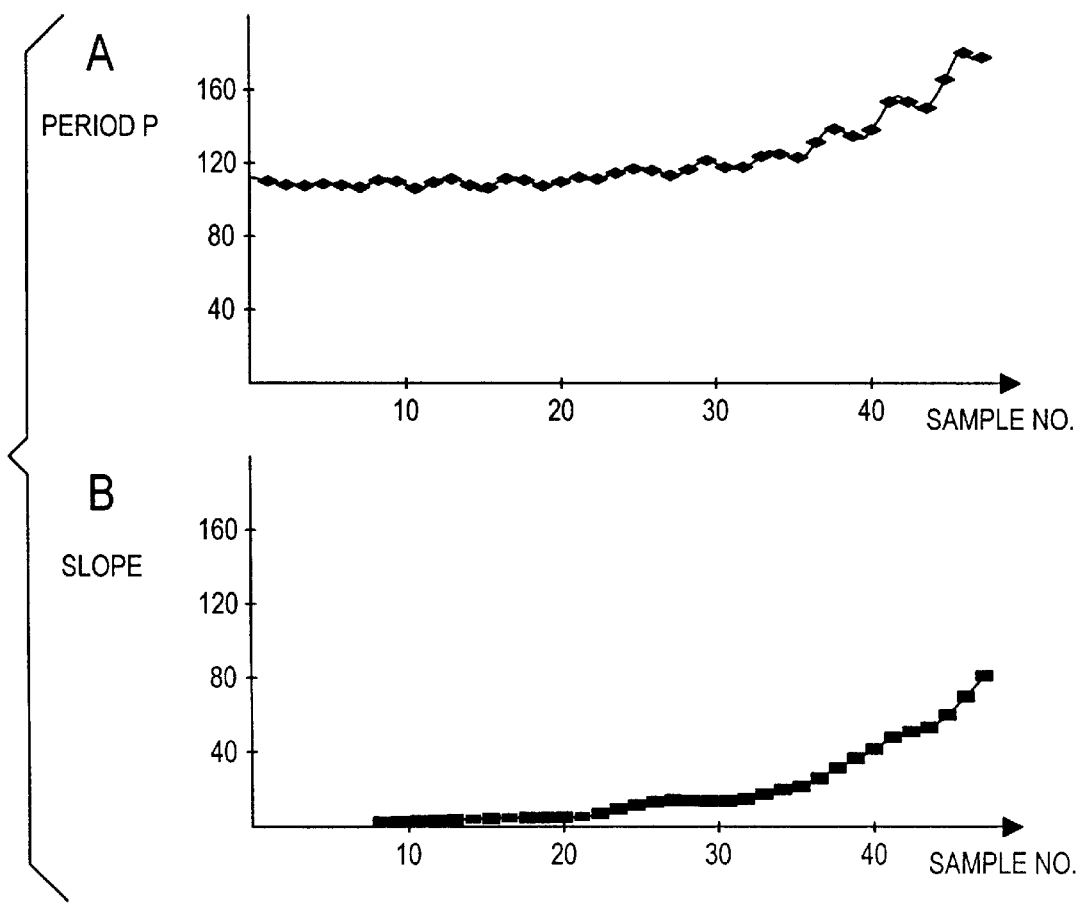
FIG. 2, Graphs A–B, depict speed samples and a computed slope according to this invention.

Graph A of FIG. 2 depicts a series of measured periods P between successive sensor pulses 21 as a panel 12 such as an automotive side window is driven toward a closed position, with each sample corresponding to a received sensor pulse 21. In the first portion of the depicted data (samples 1–30), the motor speed is relatively constant, although a periodic undulation of the measured period P occurs due to motor torque ripple. Significantly, the periodic undulation has a repetition interval corresponding to a fixed number of samples—four samples in the illustrated embodiment. At sample 30, the panel 12 contacts an object that exerts a small initial resistance to further panel movement. As a result, the panel speed is gradually reduced, as indicated by a correspondingly gradual increase in the measured period P. While the rising slope (change in speed) of the period P is easy enough to see in Graph A, the periodic undulation of the data can easily mask the rising slope.

According to the present invention, the slope of the period data depicted in Graph A of FIG. 2 is computed in a way that cancels the effect of the periodic undulation of the data, and the presence of an obstacle is detected by comparing the computed slope to a slope threshold that is selected as a function of the average motor speed. The slope threshold for obstacle detection decreases with increasing average motor speed so that obstacle detection occurs when the panel exerts a given force on the panel, regardless of the panel speed. In operation, the controller 16 stores successively measured periods in an array, computes the average period at two different points in the array, and determines the slope of the period data according to the difference between the computed average speeds. To minimize or eliminate the effects of the periodic undulation of the data, the average periods are computed based on period data points that are separated by one-half of the repetition interval of the undulation. In the illustrated embodiment where the undulation has a repetition interval of four samples, one-half of the repetition interval is two samples, and the average periods are computed based on period samples separated by an intervening period sample.

To further illustrate the above-described method, it is assumed that the controller 16 stores the most recent N measured periods in an array which may be described as [P(0), P(1), P(2) . . . P(N−3), P(N−2), P(N−1)], where P(0) is the most recently measured period. If the repetition interval of the periodic undulation is X samples, an undulation-insensitive average AVG1 of the newest data in the array may be computed based on the arithmetic average of P(0) and P(X/2). Similarly, an undulation-insensitive average AVG2 of the oldest data in the array may be based on the arithmetic average of P(N−1) and P(N−(1+X/2)). Thus, the array size N must be at least as great as the repetition interval X of the periodic undulation. The slope of the data stored in the array is computed, in turn, based on the difference between AVG1 and AVG2. Since the averages AVG1 and AVG2 are insensitive to the periodic undulation, the slope based on their difference is also insensitive to the periodic undulation. Accordingly, the slope determined in this way provides a reliable measure of motor or panel speed change over the interval of N sensor pulses, as demonstrated by the slope data depicted in Graph B of FIG. 2. According to the invention, the slope so determined is compared to a threshold slope to detect the presence of an obstacle. Preferably, the threshold is selected based on the average speed (or period) during the interval, with the threshold increasing with decreasing average motor speed (increasing period); in this way, obstacle detection occurs when the obstacle exerts a given force on the panel 12, regardless of the panel speed.

Figure 3:
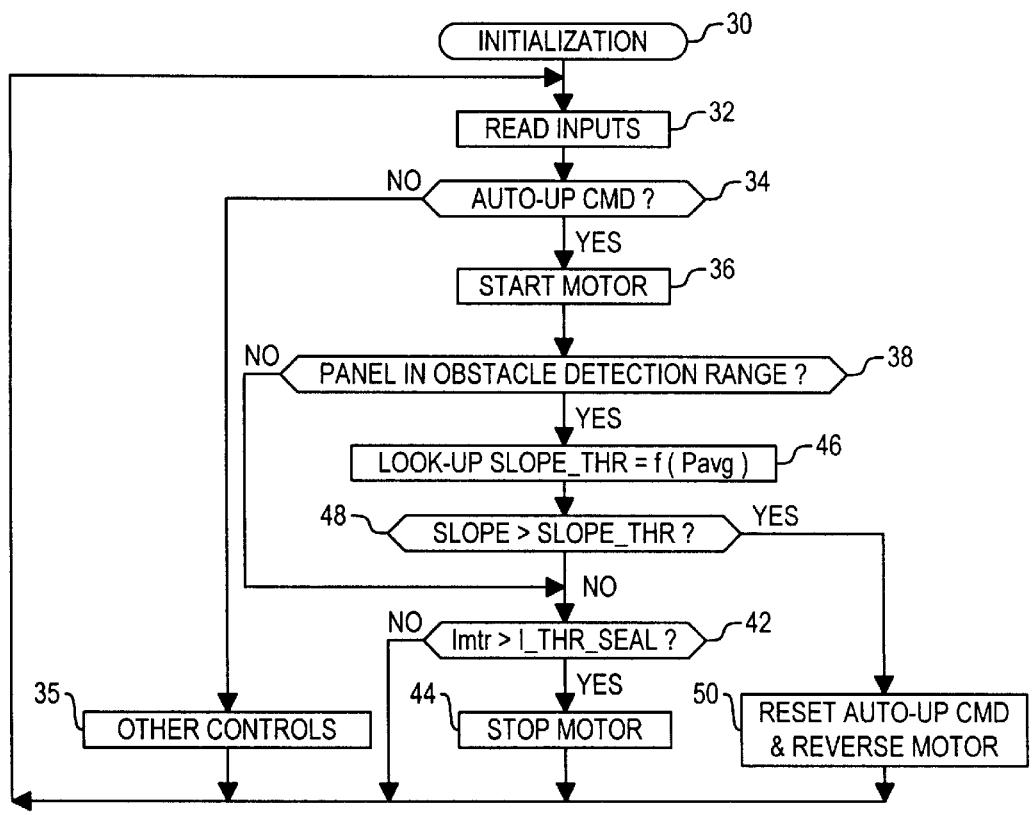
FIGS. 3 and 4 are flow diagrams representative of computer program instructions executed by the microprocessor based control unit of FIG. 1 in carrying out the method of this invention.
Figure 4:
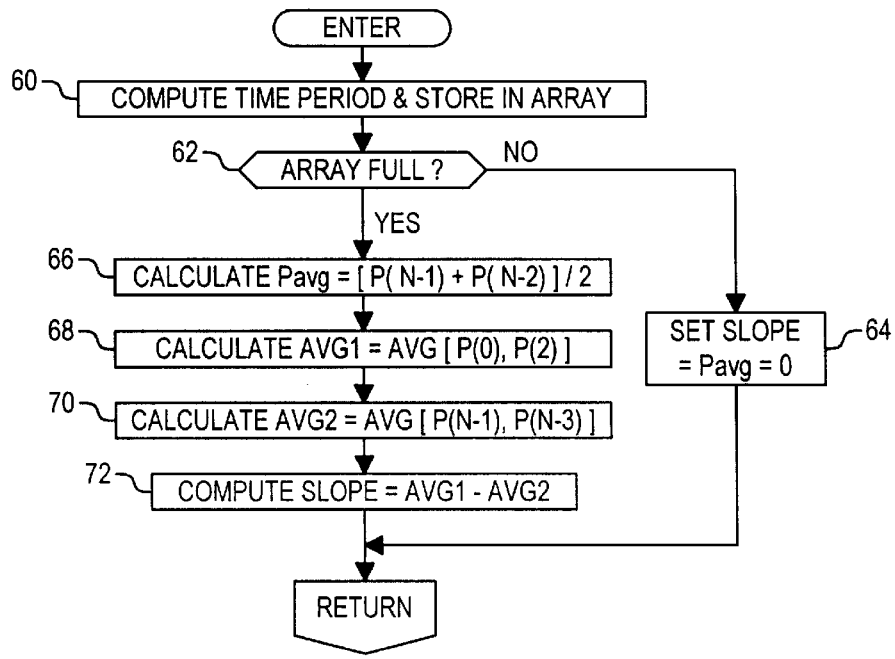

FIG. 3 is a flow diagram representative of computer program instructions executed by the microprocessor-based controller 16 of FIG. 1 in carrying out the above-described control method in the context of an "auto-up" command for a vehicle side window. In the background, the controller 16 executes a program corresponding to the flow diagram of FIG. 4 each time a sensor pulse 21 is received for computing a period P corresponding to the time since receipt of the last sensor pulse, an average (Pavg) of the stored period data, and a slope (SLOPE) of the stored period data. Referring to FIG. 4, the block 60 computes a period P each time a sensor pulse 21 is received, and stores the period P in an array. Initially, the array is not full, and the blocks 62, 64 set SLOPE and Pavg to zero. Once the array is full, the blocks 66–72 compute Pavg, AVG1, AVG2 and SLOPE, as described above. On receipt of each subsequent sensor pulse, the newly computed period P replaces the oldest period in the array, and the blocks 66–72 are re-executed to update Pavg and SLOPE.

Referring to FIG. 3, the block 30 designates a series of initialization instructions executed at the initiation of each period of vehicle operation. After initialization, the block 32 is executed to read various inputs such as the switch inputs 24 and the motor current Imtr. If the switch inputs 24 command auto-up operation (that is, a command to automatically raise and close the window without the operator having to manually hold the switch in an "up" position), the blocks 36–50 are executed to carry out the control of this invention; otherwise another control designated by the block 35 is executed. The block 36 activates the motor 14 to raise the panel 12, and as long as the panel 12 is within a range of positions where the presence of an obstacle is possible (as determined at block 38), the blocks 46–48 are executed to determine a slope threshold SLOPE_THR and to compare the current value of SLOPE to SLOPE_THR. As indicated, the threshold SLOPE_THR is determined based on the average period Pavg in the array (which of course, corresponds inversely with the average motor speed). When Pavg is relatively large, the motor speed is slow, and exerts a relatively low force on an obstacle; in this case, the threshold SLOPE_THR is set relatively high. When Pavg is small, the motor speed is high, and exerts a relatively high force on an obstacle; in this case the threshold SLOPE_THR is set relatively low. At intermediate values of Pavg, the threshold SLOPE_THR is determined proportionately, or in accordance with a schedule determined by calibration. The objective, as noted above, is to schedule SLOPE_THR so that obstacle detection will occur when the panel 12 exerts a given force on the obstacle, regardless of the panel speed. If SLOPE>SLOPE_THR, an obstacle is detected, and block 50 resets the auto-up command and reverses the motor 14 to retract panel 12. If SLOPE≦SLOPE_THR, or the panel 12 is outside the obstacle detection range, the block 42 is executed to compare the motor current Imtr to a threshold I_THR_SEAL indicative of a sealed (fully closed) window. If Imtr>I_THR_SEAL, the block 44 is executed to stop motor 14.

In summary, this invention provides an improved control method for quickly and reliably detecting the presence of an obstacle in the path of a motor-driven panel, even when the obstacle is compliant and offers only a small initial resistance to panel movement. While the method of this invention has been described in reference to the illustrated embodiment, it is expected that various modifications in addition to those mentioned above will occur to those skilled in the art. Accordingly, it will be understood that methods incorporating such modifications may fall within the scope of this invention, which is defined by the appended claims.

What is claimed is:

1. A method for detecting an obstacle in a path of a motor-driven panel comprising the steps of:

producing pulses corresponding to panel movement, said pulses having a characteristic pattern of variability in time that repeats every X pulses;

determining and storing time samples corresponding to time periods between successively produced pulses;

computing first and second average time samples based on first and second respective pairs of the stored time samples, the time samples forming each of said first and second pairs being separated by X/2 samples, so that said first and second average time samples are substantially insensitive to said characteristic pattern of variability;

computing a slope of said stored time samples based on a difference between said first and second average time samples; and detecting an obstacle when the computed slope exceeds a determined threshold.

2. The method of claim 1, wherein said threshold is determined based on a speed of said panel, such that the threshold decreases with increasing speed of said panel, whereby said obstacle is detected when it applies a predetermined force to said panel.

3. The method of claim 1, wherein the determined time samples are stored in an array of N time samples so that when the array is filled, the time samples stored in the array correspond to time periods between the last N pulses produced, where N is at least as great as X.

4. The method of claim 3, wherein the first average time sample is computed according to an arithmetic average of $P(0)$ and $P(X/2)$, and the second average time sample is computed according to an arithmetic average of $P(N-(1+X/2))$ and $P(N-1)$, where $P(0)$ to $P(N-1)$ represent the N time samples stored in the array.

* * * * *